(12) United States Patent
Oh

(10) Patent No.: US 8,116,062 B2
(45) Date of Patent: Feb. 14, 2012

(54) METAL CAPACITOR TO IMPROVE ELECTRIC CONDUCTIVITY

(76) Inventor: Young Joo Oh, Seoul (KR)

( * ) Notice: Subject to any disclaimer, the term of this patent is extended or adjusted under 35 U.S.C. 154(b) by 790 days.

(21) Appl. No.: 12/155,774

(22) Filed: Jun. 10, 2008

(65) Prior Publication Data

US 2009/0103245 A1 Apr. 23, 2009

(30) Foreign Application Priority Data

Oct. 19, 2007 (KR) .................. 10-2007-0105718
May 23, 2008 (KR) .................. 10-2008-0048003

(51) Int. Cl.
*H01G 4/005* (2006.01)
*H01G 4/06* (2006.01)
*H01G 9/00* (2006.01)
*H01G 9/04* (2006.01)

(52) U.S. Cl. ......... 361/303; 361/311; 361/523; 361/532

(58) Field of Classification Search ............... 361/541, 361/529, 525, 523, 532, 303, 311
See application file for complete search history.

(56) References Cited

U.S. PATENT DOCUMENTS 6,166,899 A 12/2000 Tamamitsu
6,855,177 B2 * 2/2005 Fujii et al. .................. 29/25.03
7,326,261 B2 * 2/2008 Nagasawa et al. .......... 29/25.03
7,793,396 B2 * 9/2010 Shioga et al. .............. 29/25.41

FOREIGN PATENT DOCUMENTS

JP 2004158577 A * 6/2004

* cited by examiner

*Primary Examiner* — Jayprakash N Gandhi
*Assistant Examiner* — Arun Ramaswamy
(74) *Attorney, Agent, or Firm* — Rosenbreg, Klein & Lee

(57) ABSTRACT

A metal capacitor in which an electric conductivity is significantly improved by applying a metal material for an electrolyte and a manufacturing method thereof is provided. The metal capacitor includes a terminal increase-type metal member; a metal oxide layer being formed on the terminal increase-type metal member; an insulating layer being formed on the main electrode layers and the terminal increase-type metal member to externally expose the first and the second electrode withdrawing portions of the terminal increase-type metal member; a main electrode layer being formed at the through-hole forming portion to fill in the plurality of through-holes formed on the through-hole forming portion of the terminal increase-type metal member; a first and a second lead terminals; and a sealing member sealing the terminal increase-type metal member connected to the first and the second lead terminals to externally expose the first and the second lead terminals.

13 Claims, 6 Drawing Sheets

METAL CAPACITOR TO IMPROVE ELECTRIC CONDUCTIVITY

BACKGROUND

1. Field

The present invention relates to a metal capacitor and a manufacturing method thereof, and more particularly, to a metal capacitor in which an electric conductivity is significantly improved by applying a metal material for an electrolyte and a manufacturing method thereof.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to the current development in digitalization and thinness of electronic devices, when applying the conventional aluminum electrolytic capacitor, there are some problems as follow.

Since the aluminum electrolytic capacitor uses the electrolyte, an electric conductive is comparatively low and thus a lifespan of the aluminum electrolytic capacitor is reduced in a high frequency area. Also, there are some constraints on improvement of reliability, a high frequency response, a low equivalent series resistance (ESR), and impedance. Also, due to a comparatively high ripple pyrexia, there are some constraints on stability and environments, such as fuming and firing.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof The present invention also provides a metal capacitor which can improve miniatures, a low equivalent series resistance (ESR), a reduction in a ripple pyrexia, a long life, a heat-resistant stability, non-fuming, non-firing, and environment by using a metal material for an electrolyte, and a manufacturing method thereof According to an aspect of the present invention, there is provided a metal capacitor including: a terminal increase-type metal member comprising a through-hole forming portion where a plurality of through-holes is arranged, and first and second electrode withdrawing portions formed on the through-hole forming portion; an insulating layer being formed on the terminal increase-type metal member to externally expose the first and the second electrode withdrawing portions of the terminal increase-type metal member; a metal oxide layer being formed on the terminal increase-type metal member; a main electrode layer being formed at the through-hole forming portion to fill in the plurality of through-holes formed on the through-hole forming portion of the terminal increase-type metal member; a first lead terminal being selectively connected to the first and the second electrode withdrawing portions of the terminal increase-type metal member; a second lead terminal being connected to the main electrode layer of the terminal increase-type metal member; and a sealing member sealing the terminal increase-type metal member connected to the first and the second lead terminals to externally expose the first and the second lead terminals.

According to another aspect of the present invention, there is provided a method of forming a metal capacitor, including: forming pattern or groove to material by appling one of a printing ink, physical scratches, scratches using a nano needle; forming a through-hole forming portion that includes a plurality of through-holes arranged on a member to thereby form a terminal increase-type metal member integrally formed with first and second electrode withdrawing portions by using a direct current (DC) etching; forming a metal oxide layer on the terminal increase-type metal member by using an anodizing way, when the through-hole forming portion, and the first and the second electrode withdrawing portions are integrally formed on the terminal increase-type metal member; forming an insulating layer on the main electrode layer and the terminal increase-type metal member to externally expose the first and the second electrode withdrawing portions of the terminal increase-type metal member by using a chemical vapor deposition (CVD); forming a seed electrode layer on the metal oxide layer formed in the through-hole forming portion to be penetrated into the metal oxide layer by using an electroless plating or an electroplating; forming a main electrode layer to fill in the plurality of through-holes formed on the through-hole forming portion of the metal member by using the seed electrode layers as media; connecting the second lead terminal to the main electrode layer of the terminal increase-type metal member and connecting the first lead terminal to the first and the second electrode withdrawing portions of the metal member, when the conductive connecting layer is formed; and sealing the terminal increase-type metal member with a sealing member to externally expose the first and the second lead terminals, when the first and the second lead terminals are connected.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments of a piezoelectric substrate according to the present invention will be described with reference to the accompanying drawings.

First Embodiment

Hereinafter, a configuration of a metal capacitor according to a first embodiment of the present invention will be described with reference to the accompanying drawings.

Figure 1:
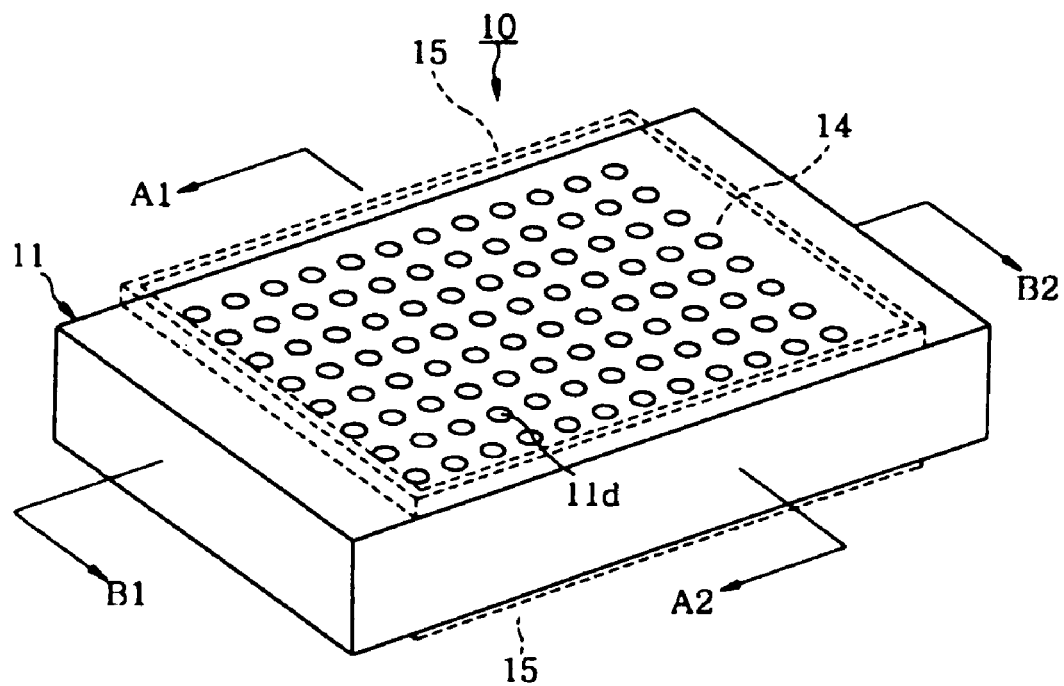
FIG. 1 is a perspective view of a metal capacitor according to a first embodiment of the present invention.
Figure 2:
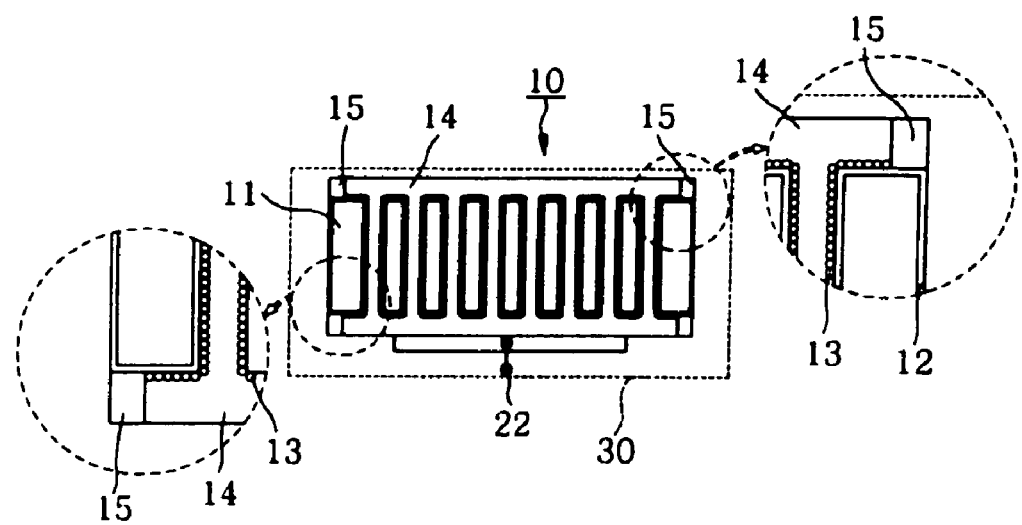
FIG. 2 is a cross-sectional view cut along A1-A2 line of the metal capacitor shown in FIG. 1.
Figure 3:
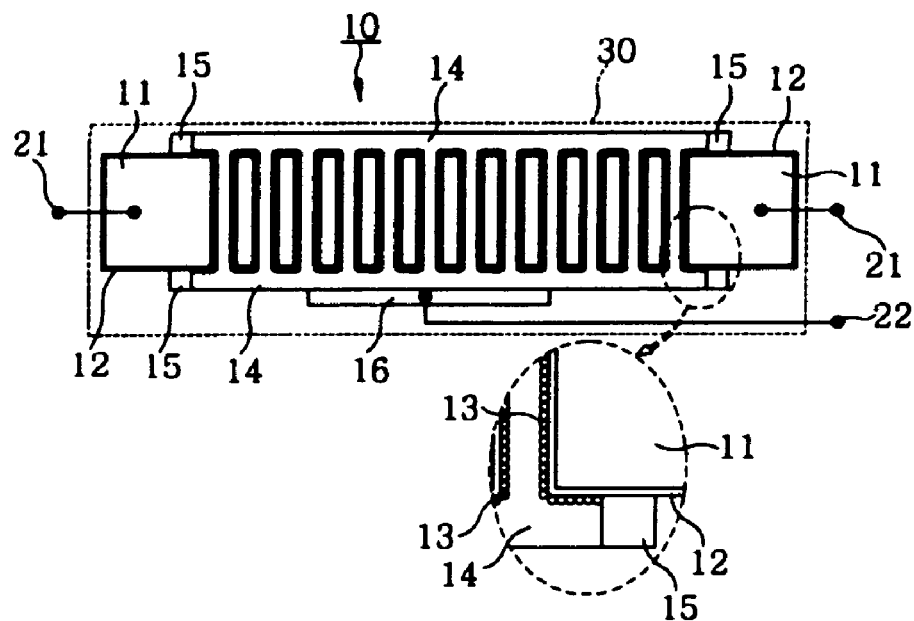
FIG. 3 is a cross-sectional view cut along B1-B2 of the metal capacitor shown in FIG. 1.

FIG. 1 is a perspective view of a metal capacitor 10 according to the first embodiment of the present invention, FIG. 2 is a cross-sectional view cut along A1-A2 line of the metal capacitor 10 shown in FIG. 1, and FIG. 3 is a cross-sectional view cut along B1-B2 of the metal capacitor 10 shown in FIG. 1. As shown in the figures, the metal capacitor 10 according to the first embodiment of the present invention includes a terminal increase-type metal ember 11, a metal oxide layer 12, a seed electrode layer 13, a main electrode layer 14, an insulating layer 15, a first lead terminal 21, a second lead terminal 22, and a sealing member 30. Hereinafter, the configuration thereof will be sequentially described.

Figure 4A:
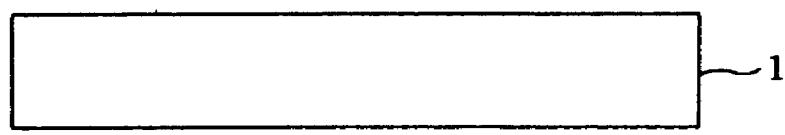
FIGS. 4A through 4G are cross-sectional views illustrating a method of manufacturing the metal capacitor according to the first embodiment of the present invention.
Figure 4B:
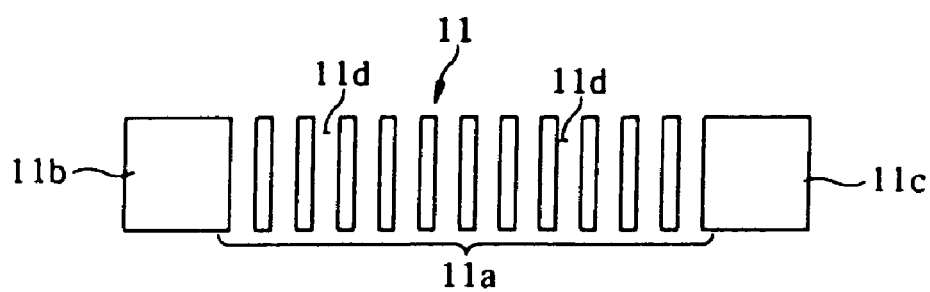

As shown in FIG. 4B, the terminal increase-type metal member 11 includes a through-hole forming portion 11a that is provided by arranging a plurality of through-holes 11d, and first and second electrode withdrawing portions 11b and 11c formed on one end and another end of the through-hole forming portion 11 a. The through-hole 11d is formed in a circular or a polygonal shape. To form the first and the second electrode withdrawing portions 11b and 11c on the terminal increase-type metal member 11 is to increase a number of terminals and thereby construct the metal capacitor 10 to three terminals when constructing the polar metal capacitor 10 by selectively connecting the first lead terminal 21 to the first and the second electrode withdrawing portions 11b and 11c. Even when the metal capacitor 10 is non-polar, it is possible to construct the metal capacitor 10 to have two terminals. The terminal increase-type metal member 11 is integrally formed with the through-hole forming portion 11a, and the electrode withdrawing portion 11b and 11c. The plurality of through-holes 11d formed in the through-hole forming portion 11a is formed in a cylindrical shape to readily form the through-hole 11d. The terminal increase-type metal member 11 uses metal member, for example, any one of aluminum (Al), niobium (Nb), tantalum (Ia), titanium (Ti), and zirconium (Zr).

The metal oxide layer 12 is formed on the terminal increase-type metal member 11. As shown in FIG. 1, the metal oxide layer 12 is formed on all the surfaces, including both surfaces of the terminal increase-type metal member 11, that is, the surface of the plurality of through-holes 11d, the top/bottom surface thereof, and the like. The metal oxide layer 12 formed on the terminal increase-type metal member 11 uses any one of alumina($Al_2O_3$), niobium monoxide (NbO), niobium pentoxide(Nb2O5), tantalum pentoxide (Ta2O5), titanium dioxide(TiO2), and zirconium dioxide (ZrO2).

The insulating layer 15 is formed on the terminal increase-type metal member 11 so that the first and the second electrode withdrawing portion 11b and 11c of the terminal increase-type metal member 11 may be externally exposed. The insulating layer 15 can be formed after forming a main electrode layer 14. Thus, the insulating layer 15 is formed on a metal member 11 and/or a main electrode layer 14. Specifically, as shown in FIG. 1, the insulating layer 15 is formed on the terminal increase-type metal member 11 and/or the main electrode layer 14 along the main electrode layer 14, to externally expose the first and the second electrode withdrawing portions 11b and 11c, and uses an insulating tape or a resin-based material.

The seed electrode layer 13 is formed on the metal oxide layer 12 that is formed on both surfaces of the through-hole forming portion 11a of the terminal increase-type metal member 11. The main electrode layer 14 is formed on the seed electrode layer formed on both surfaces of the through-hole forming portion 11a to fill in the plurality of through-holes 11d formed on the through-hole forming portion 11a of the metal member 11. Each of the seed electrode layer 13 and the main electrode layer 14 uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au). However, the seed electrode layer 13 may be removed and not be applied depending on requirement of the user.

The first lead terminal 21 is selectively connected to the first and the second electrode withdrawing portions 11b and 11c of the terminal increase-type metal member 11. The first lead terminal 21 selectively connected to the first and the second electrode withdrawing portion 11b and 11c may be connected to both the first and the second electrode withdrawing portions 11b and 11c to thereby be applied as a polar lead terminal, or may be connected to one of the first and the second electrode withdrawing portions 11b and 11c to thereby be applied as a non-polar lead terminal.

The second lead terminal 22 is connected to the main electrode layer 14 of the terminal increase-type metal member 11. In order to improve the adhesiveness of the second lead terminal 22 when connecting the second lead terminal 22 to the main electrode layer 14, a conductive adhesive layer 16 is further provided on the main electrode layer 14.

The sealing member 30 seals the terminal increase-type metal member 11 connected to the first and the second lead terminals 21 and 22, so that the first and the second lead terminals 21 and 22 may be externally exposed. Through this, it is possible to protect the metal capacitor 10 from an outside. The sealing member 30 uses molding material or a cover member with an empty inside.

Hereinafter, a manufacturing method of the metal capacitor 10 according to the first embodiment will be described with reference to the accompanying drawings.

When a member 1 such as layer, foil, etc., of a metal material is provided as shown in FIGS. 4A and 4B, the manufacturing method of the metal capacitor 10 according to the first embodiment of the present invention forms a pattern (not shown) using a printing ink or physical scratch, or scratches using a nano needle. The manufacturing method forms the groove forming portion 11a where the plurality of grooves 11d is arranged on both surfaces of the member 1 using a direct current (DC) etching and thereby forms the terminal increase-type metal member 11 integrally formed with the first and the second electrode withdrawing portions 11b and 11c on one end and the other end of the groove forming portion 11a.

When forming the plurality of through-holes 11d in the through-hole forming portion 11a, each through-hole 11d is formed to have a diameter of about 1 μm through 100 μm. Since the plurality of through-holes 11d is formed in a cylindrical shape to be passed through, it is possible to form the plurality of through-holes 11d using a DC etching, an alternative current (AC) etching, a wet etching, a mechanical drill, or a laser drill.

The DC etching performs a pre-processing process for the member 1 in an aqueous solution with about 1% through 3% of phosphoric acid in the temperature of about 50° C. during about one through three minutes, and performs first etching in the mixture of sulfuric acid, phosphoric acid, aluminum, etc. in the temperature of about 70° C. and 90° C. during about two through ten minutes. In this case, the current density is about 100 mA/cm$^2$ through 400 mA/cm$^2$. The DC etching performs second etching in the mixture of nitric acid, phosphoric acid, aluminum, etc., in the temperature of about 80° C. during ten minutes. In this case, the current density is about 10 mA/cm$^2$ through 100 mA/cm$^2$. When the first etching and the second etching are completed, chemical cleaning is performed in the solution of nitric acid 30 g through 70 g/l in the temperature of about 60° C. through 70° C. during about ten minutes.

Figure 4C:
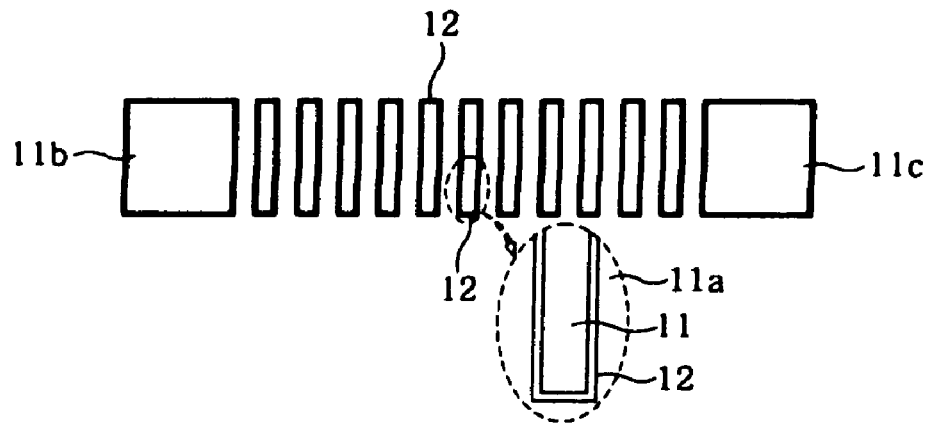

As shown in FIG. 4C, when the through-hole forming portion 11a, and the first and the second electrode withdrawing portions 11b and 11c are integrally formed on the terminal increase-type metal member 11, a forming process of forming the metal oxide layer 12 on the metal member 11 by using an anodizing way is performed.

The anodizing method initially performs a boiling process in the temperature of about 80° C. through 100° C. during one through fifteen minutes in a deionized water, proceeds first oxidation in an aqueous solution of boric acid and boric acid-ammonium with 120 through 150 voltages, and proceeds a plurality of, two or three times of oxidations with changing the concentration and the voltage of the aqueous solution. The anodizing method performs a thermal treatment in the predetermined temperature, for example, in the temperature of 400° C. through 600° C. to perform a reforming process. Also, the anodizing method proceeds a by-product treatment in order to disposal and remove the by-product generated in the reforming process. Also, the anodizing method repeats the reforming process and the thermal treatment and proceeds a predetermined cleaning process in order to clean boric acid or phosphoric acid.

Figure 4D:
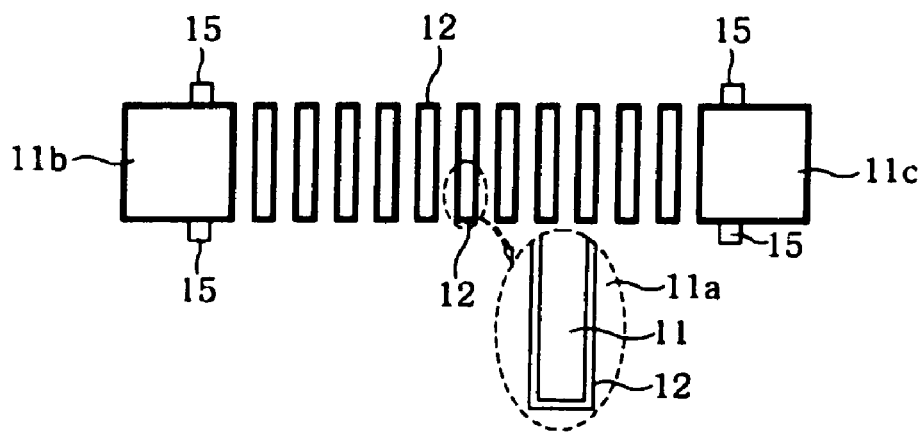

As shown in FIG. 4D, a through type metal member 10a is formed by forming the insulating layer 15 on the main electrode layer 14 and/or the insulating layer 15 of the terminal increase-type metal member 11 by using a chemical vapor deposition (CVD), so that the first and the second electrode withdrawing portion 11b and 11c of the terminal increase-type metal member 11 may be externally exposed. Although the CVD is used herein, it is possible to apply any one of a diping process using an insulating resin or insulating ink, a spray process using ink-jet printing or screen printing, and a stamping process.

Figure 4E:
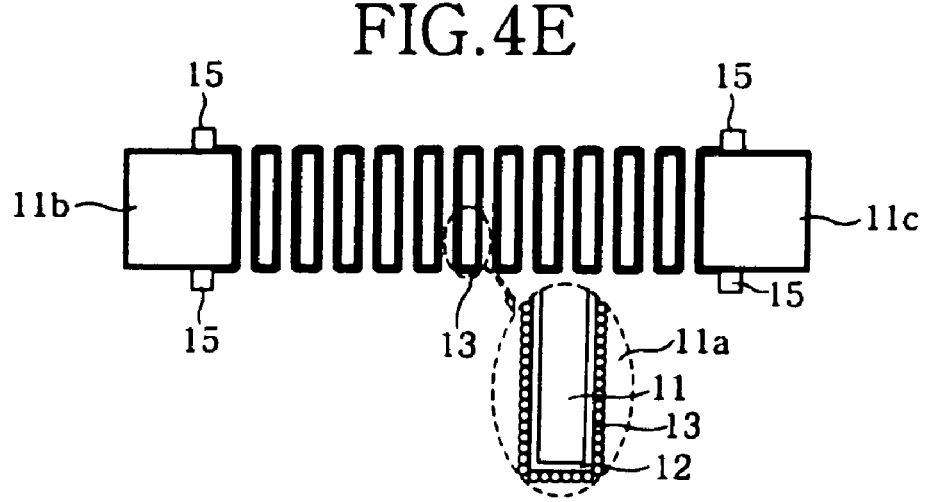

As shown in FIG. 4E, a seed electrode layer 13 is formed on the metal oxide layer 12 that is formed in the through-hole forming portion 11a to be penetrated into the metal oxide layer 12 by using an electroless plating or an electroplating. However, the seed electrode layer 13 may be removed and not be applied depending on requirement of the user.

The manufacturing method deposits a predetermined amount of palladium sulfate aqueous solution as an activator during 10 through 300 seconds in the seed electrode layer forming process and removes the activator of surface thereof by dipping and cleaning during one through thirty seconds at the normal temperature. Nickel phosphate aqueous solution applies in the nickel electroless plating and plates during about five through twenty minutes by adjusting pH range (4 through 8 pH) and temperature (50° C. through 80° C.). In this case, the seed electrode layer 13 forms in an inner part of the through-holes 11d. An additional plating process and a dry process less than 100° C. may be performed depending on requirement of a user.

Figure 4F:
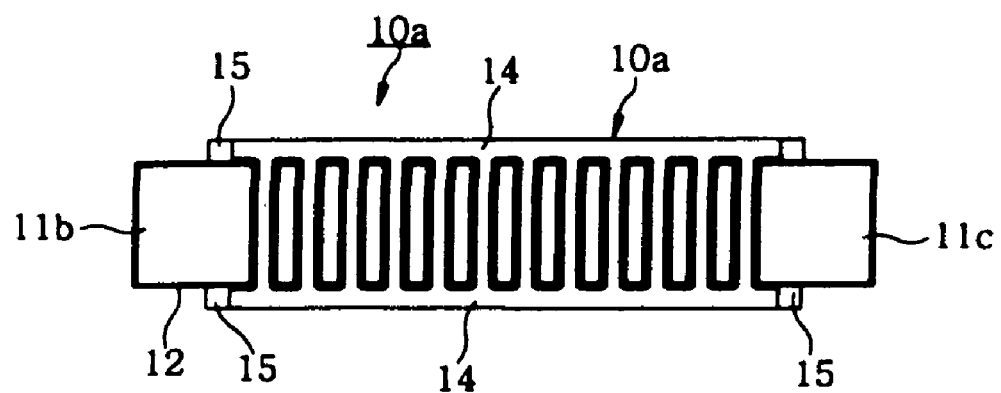
Figure 4G:
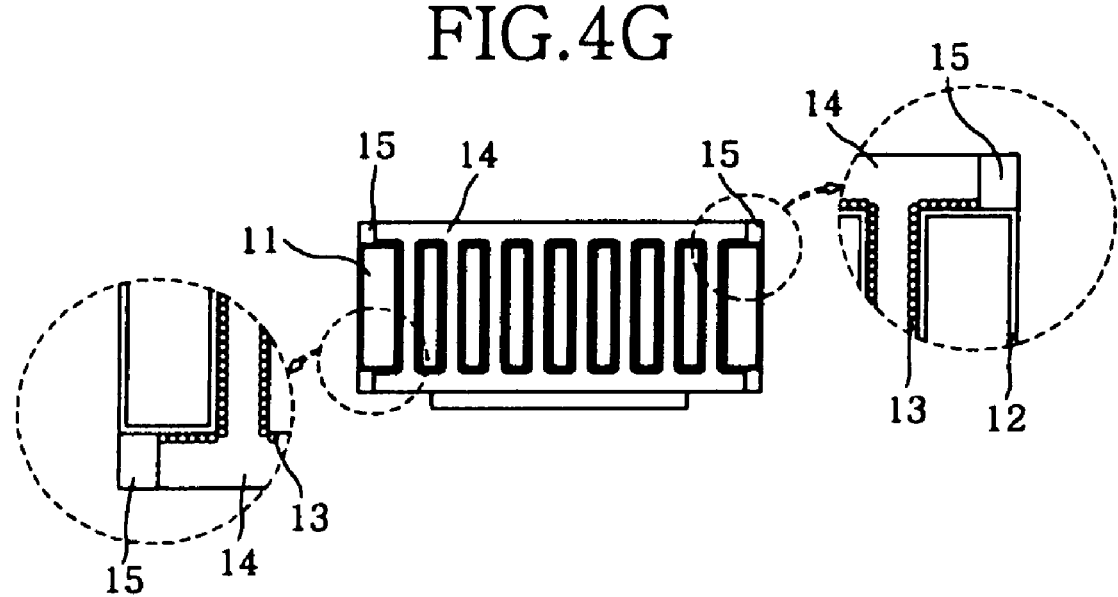

As shown in FIG. 4F, a main electrode layer 14 is formed to fill in the plurality of through-holes 11d formed in the through-hole forming portion 11a of the terminal increase-type metal member 11 by using the seed electrode layers 13 as media, by using the electroless plating or the electroplating.

In the electroplating for forming the main electrode layer 14, the electroplating method adjusts pH range (1 through 5 pH) and temperature (30° C. through 70° C.) and applies D.C(Direct Current) with current density of 20 through 120 mA/cm$^2$ in sulfuric acid nickel aqueous solution or nickel chloride aqueous solution.

In the electroless plating for forming the main electrode layer 14, the electroless plating method adjusts pH range (5 through 7 pH) and temperature (70° C. through 90° C.) and proceeds material having seed electrode layer 13 during about ten through thirty minutes and removes plating solution components of surface thereof by dipping and cleaning during one through thirty seconds at the normal temperature.

As shown in FIGS. 2 and 3, the second lead terminal 22 is connected to the main electrode layer 14 of the terminal increase-type metal member 11 and the first lead terminal 21 is selectively connected to the first and the second electrode withdrawing portions 11b and 11c. Specifically, when the metal capacitor is constructed to have a non-polarity, the second lead terminal 22 is connected to one of the first and the second electrode withdrawing portions 11b and 11c. A process of forming the conductive layer on the main electrode layer 14 connected with the first lead terminal 22 in order to improve the adhesiveness of the first and the second lead terminals 21 and 22 is further provided between the process of forming the insulating layer on the main electrode and the terminal increase-type metal member 11 and the process of connecting the first lead terminal 21 to the main electrode layer 14 and selectively connecting the second lead terminal 21, to the first and the second electrode withdrawing portions 11b and 11c. The conductive adhesive layer 16 uses any one of a method of spraying metal adhesives or solder paste, the electroplating, and the electroless plating.

As shown in FIG. 3, when the first and the second lead terminals 21 and 22 are connected, the metal member 11 is sealed with the sealing member 30 so that the first and the second lead terminals 21 and 22 may be externally exposed. When sealing the terminal increase-type metal member 11 with the sealing member 30, the metal terminal increase-type member 11 is sealed using molding material or a cover member with an empty inside.

Embodiment 2

A non-polar metal capacitor 110 using the through type metal member 10a constituting the metal capacitor 10 according to the first embodiment of the present invention will be described with reference to the accompanying drawing.

Figure 5:
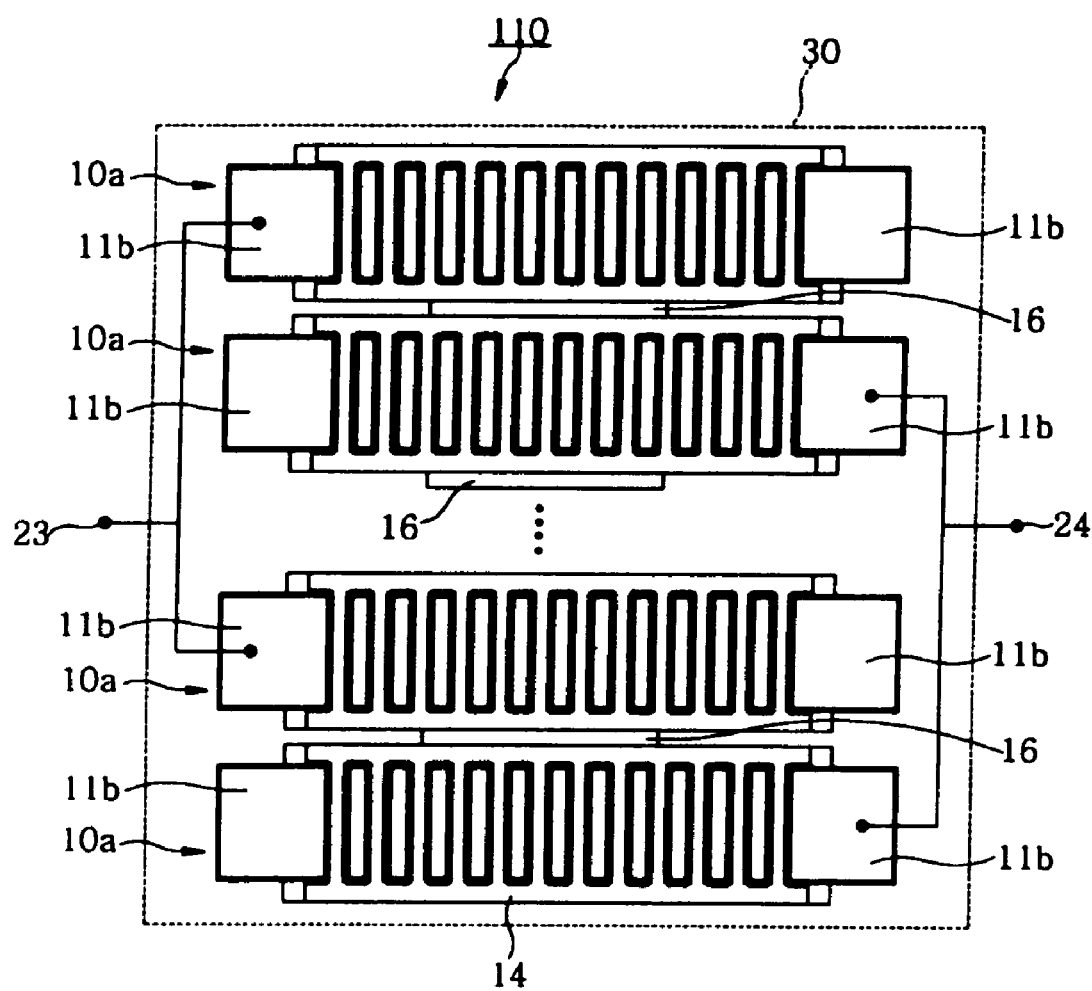
FIG. 5 is a cross-sectional view of a metal capacitor according to a second embodiment of the present invention.

As shown in FIG. 5, the metal capacitor 110 according to the second embodiment of the present invention includes a plurality of through type metal members 10a, a conductive adhesive layer 16, a third lead terminal 23, a fourth lead terminal 24, and a sealing member 30. Through this configuration, the non-polar metal capacitor 110 is constructed. Hereinafter, the configuration thereof will be sequentially described.

Each of the plurality of through type metal members 10a includes the terminal increase-type metal member 11, the metal oxide layer 12, the seed electrode layer 13, the main electrode layer 14, and the insulating layer 15. The configuration thereof is the same as the configuration of the through-type metal member 10a of FIG. 4F, and thus further detailed descriptions will be omitted here. Hence, the seed electrode layer 13 may be removed and not be applied depending on requirement of the user.

The plurality of through type metal members 10a is sequentially disposed. The conductive adhesive layer 16 is disposed between the main electrode layers 14 of the plurality of through type metal members 10a and thereby adheres the plurality of through type metal members 10a. The third lead terminal 23 is connected to the first electrode withdrawing portions 11b of the through type metal members 11 that are located in odd $number^{th}$ locations among the plurality of disposed through type metal members 10a. Specifically, as shown in FIG. 4, when it is assumed that, among the plurality of disposed through type metal members 10a, an uppermost located through type metal member 10 is a first through type metal member 10a and a through type metal member 10 located therebelow is a second through type metal member 10a, the third terminal 23 is connected to the first electrode withdrawing portions 11b of the through type metal members 10a located in the odd $number^{th}$ locations such as the first or the third location. Conversely, the fourth terminal 24 is connected to the second electrode withdrawing portions 11c of through type metal members 10a that are located in even $number^{th}$ locations among the plurality of disposed through type metal members. Through this, the non-polar metal capacitor 110 is constructed. Specifically, the third and the fourth lead terminals 23 and 24 are connected to the first and the second electrode withdrawing portions 11b and 11c of the terminal increase-type metal member 11 formed with the metal oxide layer having the same polarity. Accordingly, the metal capacitor 110 is constructed to have the non-polarity.

When the third and the fourth lead terminals 23 and 24 are connected to the plurality of through type metal members 10a, the sealing member 30 seals the plurality of through type metal members 10a, connected with the third and the fourth lead terminals 23 and 24, so that the third and the fourth lead terminals 23 and 24 may be externally exposed. Through this, the non-polar metal capacitor 110 is constructed to protect the plurality of internally disposed through type metal members 110 from an outside.

Embodiment 3

A polar metal capacitor 120 using the through type metal member 10a constituting the metal capacitor 10 according to the first embodiment of the present invention will be described with reference to the accompanying drawing.

Figure 6:
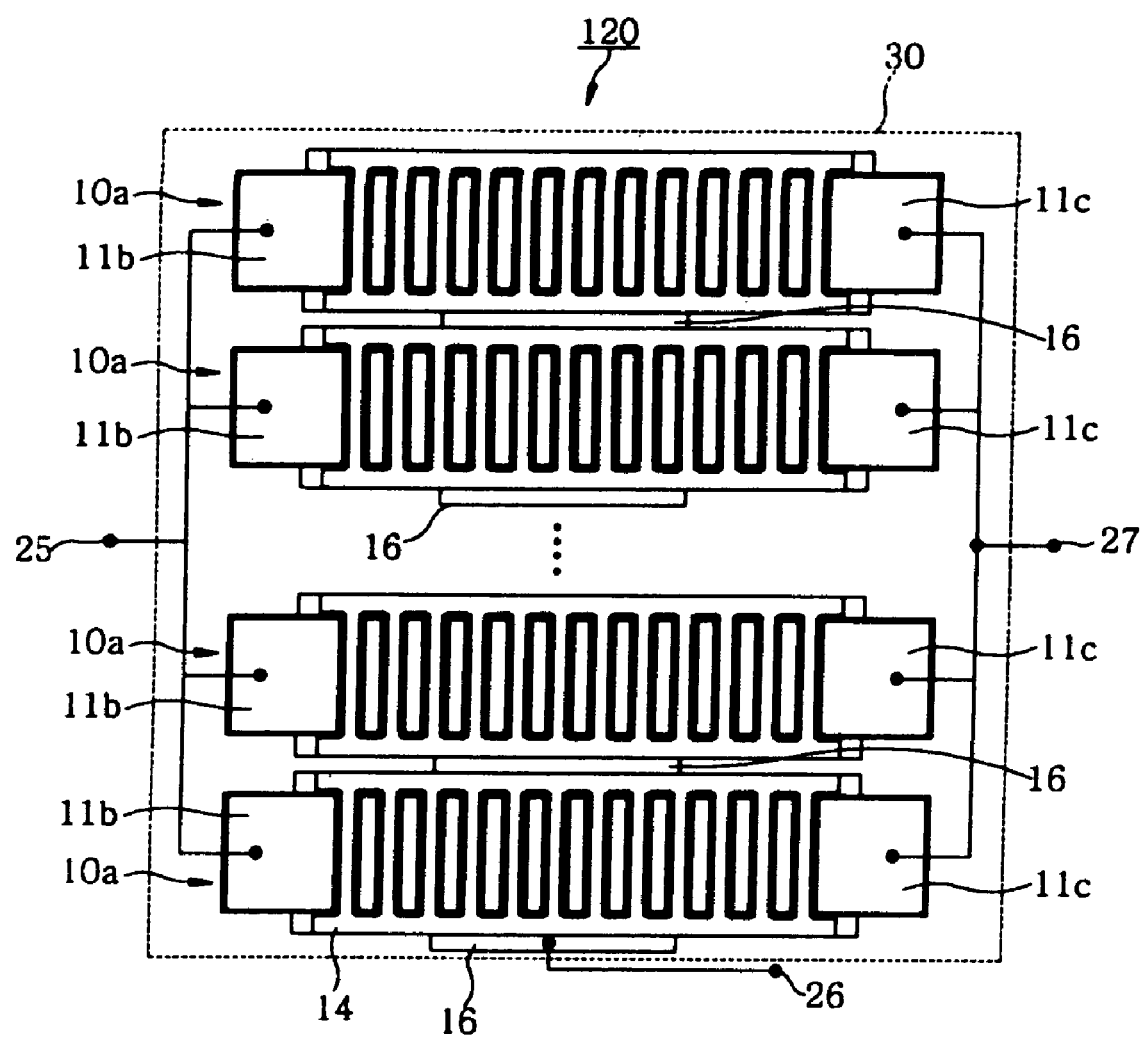
FIG. 6 is a cross-sectional view of a metal capacitor according to a third embodiment of the present invention.

As shown in FIG. 6, the meal capacitor 120 according to the third embodiment of the present invention includes a plurality of through type metal members 10a, a conductive adhesive layer 16, a first polar lead terminal 25, a second polar lead terminal 26, a third polar lead terminal 27, and a sealing member 30. Hereinafter, the configuration thereof will be sequentially described.

Each of the plurality of through type metal members 10a includes the terminal increase-type metal member 11, the metal oxide layer 12, the seed electrode layer 13, the main electrode layer 14, and the insulating layer 15. The configuration thereof is the same as the configuration of the through-type metal member 10a of FIG. 4F, and thus further detailed descriptions will be omitted here. The plurality of through type metal members 10a is sequentially disposed. The conductive adhesive layer 16 is disposed between the main electrode layers 14 of the plurality of through type metal members 10a and thereby adheres the plurality of through type metal members 10a.

The first polar lead terminal 25 is connected to the first electrode withdrawing portions 11b of the plurality of disposed through type metal members 10a to thereby function as an anode electrode. The third polar lead terminal 27 is connected to the second electrode withdrawing portions 11c of the plurality of disposed through type metal members 10a to thereby function as the anode electrode. Through this, the polar metal capacitor 120 is constructed. Specifically, since the first polar lead terminal 25 and the third polar lead terminal 27 are connected to the first and the second electrode withdrawing portions 11b and 11c of the terminal increase-type metal member 11 formed in the metal oxide layer 12, the first and the third polar lead terminals 25 and 27 function as the anode electrode. The second polar lead terminal 26 is connected to one of the main electrode layers 14 of the plurality of through type metal member 12 and is connected to the main electrode 14 where the metal oxide layer 12 is not formed. Accordingly, the second polar lead terminal 26 functions as a cathode electrode.

The terminal increase-type metal member 11 including the first and the second electrode withdrawing portions 11b and 11c may be applicable to function as the negative electrode. When the terminal increase-type metal member 11 functions as the negative electrode, the main electrode layer 14 functions as the positive electrode. Accordingly, when the second polar lead terminal 26 is applied to the cathode electrode, the first and the third polar lead terminal 25 and 27 are applied to the anode electrode. Conversely, when the second polar lead terminal 26 is applied to the anode electrode, the first and the third polar lead terminal 25 and 27 are applied to the cathode electrode. Also, when the first and the third polar lead terminal 25 and 27 are applied to the cathode electrode, the second polar lead terminal 26 is applied to the anode electrode. Conversely, when the first and the third polar lead terminal 25 and 27 are applied to the anode electrode, the second polar lead terminal 26 is applied to the cathode electrode.

In order to improve adhesiveness of the second polar lead terminal 26 functioning as the anode or the cathode electrode, the conductive adhesive layer 16 is formed on one of the main electrodes 14 of the plurality of through type metal members 10 connected to the second polar lead terminal 26. When the conductive adhesive layer 16 is formed, the second polar lead terminal 26 is connected to the conductive adhesive layer 26.

When the first through third polar lead terminals 25, 26, and 27 are connected to the plurality of through type metal members 10a, the sealing member 30 seals the plurality of through type metal members 10a, so that the first through third polar lead terminals 25, 26, and 27 may be externally exposed. Through this, it is possible to protect the plurality of internally disposed through type metal members 110 from an outside.

When constructing the metal capacitors 110 and 120 by disposing the metal capacitors 10, it is possible to obtain a metal capacitor with the high voltage and the high capacity. Also, since the through hole 11d passing through both surfaces, that is, top and bottom surfaces of the metal member 11 is formed in the metal member 11 of the metal capacitor 10, it is possible to automatically connect the main electrode layer 14 that is formed on the top/bottom surface of the metal member 11. In addition to DC etching, it is possible to regularly form and maintain the plurality of through holes 11d using a wet etching, a mechanical drill, or a laser drill. Accordingly, it is possible to improve the leakage current and withstanding voltage.

According to the present invention, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, since the polarity has no directivity, a relatively higher electrical safety is provided. Also, it is possible to improve a miniature, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
    a terminal increase-type metal member comprising a through-hole forming portion where a plurality of through-holes are arranged to extend between opposed outer surfaces, and first and second electrode withdrawing portions formed about the through-hole forming portion;
    a metal oxide layer being formed on the terminal increase-type metal member;
    an insulating layer being formed on the terminal increase-type metal member to externally expose the first and the second electrode withdrawing portions of the terminal increase-type metal member;
    a main electrode layer being formed at the through-hole forming portion extending over both of the outer surfaces to fill in the plurality of through-holes formed on the through-hole forming portion of the terminal increase-type metal member;
    a first lead terminal being selectively connected to the first and the second electrode withdrawing portions of the terminal increase-type metal member;
    a second lead terminal being connected to the main electrode layer of the terminal increase-type metal member; and
    a sealing member sealing the terminal increase-type metal member connected to the first and the second lead terminals to externally expose the first and the second lead terminals.

2. A metal capacitor comprising:
    a terminal increase-type metal member comprising a through-hole forming portion where a plurality of through-holes are arranged to extend between opposed outer surfaces, and first and second electrode withdrawing portions formed about the through-hole forming portion;
    a metal oxide layer being formed on the terminal increase-type metal member;
    an insulating layer being formed on the terminal increase-type metal member to externally expose the first and the second electrode withdrawing portions of the terminal increase-type metal member;
    a seed electrode layer being formed on the metal oxide layers that are formed on the through-hole forming portion of the terminal increase-type metal member;
    a main electrode layer being formed on the seed electrode layer formed in the through-hole forming portion extending over both of the outer surfaces to fill in the plurality of through-holes formed on the through-hole forming portion of the terminal increase-type metal member;
    a first lead terminal being selectively connected to the first and the second electrode withdrawing portions of the terminal increase-type metal member;
    a second lead terminal being connected to the main electrode layer of the terminal increase-type metal member; and
    a sealing member sealing the terminal increase-type metal member connected to the first and the second lead terminals to externally expose the first and the second lead terminals.

3. The metal capacitor of claim 2, wherein the metal member uses any one of aluminum (Al), niobium (Nb), tantalum (Ta), titanium (Ti), and zirconium (Zr).

4. The metal capacitor of claim 2, wherein the plurality of through-holes formed in the through-hole forming portion of the terminal increase-type metal member is formed in the shape of a circle or a polygon.

5. The metal capacitor of claim 2, wherein the metal oxide layer uses any one of alumina($Al_2O_3$), niobium monoxide(NbO), niobium pentoxide($Nb_2O_5$), tantalum pentoxide($Ta_2O_5$), titanium dioxide($TiO_2$), and zirconium dioxide($ZrO_2$).

6. The metal capacitor of claim 2, wherein each of the seed electrode layer and the main electrode layer uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

7. The metal capacitor of claim 2, wherein the main electrode layer further comprises a conductive adhesive layer for connecting the second lead terminal.

8. The metal capacitor of claim 2, wherein the sealing member is sealed by molding material or a cover member with an empty inside.

9. A metal capacitor comprising:

a plurality of through type metal members, each comprising: a terminal increase-type metal member comprising a through-hole forming portion where a plurality of through-holes are arranged to extend between opposed outer surfaces, and first and second electrode withdrawing portions being formed about the through-hole forming portion; a metal oxide layer being formed on the terminal increase-type metal member; a seed electrode layer being formed on the metal oxide layer formed on the through-hole forming portion of the metal oxide; a main electrode layer being formed on the seed electrode layers formed in the through-hole forming portion extending over both of the outer surfaces to fill in the plurality of through-holes formed on the through-hole forming portion terminal increase-type of the metal member; and an insulating layer being formed on the main electrode layer and/or the terminal increase-type metal member to externally expose the first and the second electrode withdrawing portions of the terminal increase-type metal member, wherein the plurality of through type metal members are sequentially disposed;

a conductive adhesive layer being interposed between the main electrode layers of the plurality of through type metal members to adhere the plurality of through type metal members;

a first lead terminal being connected to the first electrode withdrawing portions of plurality of through type metal members that are located in odd number$^{th}$ locations among the plurality of disposed through type metal members;

a second lead terminal being connected to the second electrode withdrawing portions of plurality of through type metal members that are located in even number$^{th}$ locations among the plurality of disposed through type metal members; and a sealing member sealing the plurality of through type metal members connected to the first and the second lead terminals to externally expose the first and the second lead terminals.

10. A metal capacitor comprising:

a plurality of through type metal members, each comprising: a terminal increase-type metal member comprising a through-hole forming portion where a plurality of through-holes are arranged to extend between opposed outer surfaces, and first and second electrode withdrawing portions being formed about the through-hole forming portion; a metal oxide layer being formed on the terminal increase-type metal member; a seed electrode layer being formed on the metal oxide layer formed on the through-hole forming portion of the metal oxide;

a main electrode layer being formed on the seed electrode layer formed in the through-hole forming portion extending over both of the outer surfaces to fill in the plurality of through-holes formed on the through-hole forming portion terminal increase-type of the metal member; and an insulating layer being formed on the main electrode layer and/or the terminal increase-type metal member to externally expose the first and the second electrode withdrawing portions of the terminal increase-type metal member, wherein the plurality of through type metal members are sequentially disposed;

a conductive adhesive layer being interposed between the main electrode layers of the plurality of through type metal members to adhere the plurality of through type metal members;

a first polar lead terminal being connected to the first electrode withdrawing portions of the plurality of through type metal members;

a second polar lead terminal being connected to one of the main electrode layers of the plurality of through type metal members;

a third polar lead terminal being connected to the second electrode withdrawing portions of the plurality of through type metal members; and a sealing member sealing the plurality of through type metal members connected to the first through the third polar lead terminals to externally expose the first through the third polar lead terminals.

11. The metal capacitor of claim 10, wherein the first and the third polar lead terminals are applied to an anode electrode when the second polar lead terminal is applied to a cathode electrode, and the first and the third polar lead terminal are applied to the cathode electrode when the second polar lead terminal is applied to the anode electrode.

12. The metal capacitor of claim 10, wherein the second polar lead terminal is applied to an anode electrode when the first and the third polar lead terminals are applied to a cathode electrode, and the second polar lead terminal is applied to the cathode electrode when the first and the third polar lead terminals are applied to the anode electrode.

13. The metal capacitor of claim 10, wherein one of the main electrode layers of the plurality of through type metal members connected to the second polar lead terminal further comprises a conductive adhesive layer.

\* \* \* \* \*